United States Patent [19]
Smith et al.

[11] 3,957,704
[45] May 18, 1976

[54] CROSS-LINKING AGENTS FOR ROOM TEMPERATURE VULCANIZABLE SILICONE RUBBER COMPOSITIONS

[75] Inventors: Robert A. Smith, Schenectady; Richard P. Surprenant, Troy, both of N.Y.

[73] Assignee: General Electric Company, Waterford, N.Y.

[22] Filed: Dec. 19, 1974

[21] Appl. No.: 534,295

[52] U.S. Cl. .......................... 260/18 S; 260/46.5 G; 260/46.5 E; 260/37 SB; 260/448.2 R; 260/448.2 N
[51] Int. Cl.² .......................................... C08L 91/00
[58] Field of Search .......... 260/46.5 G, 18 S, 37 SB, 260/825, 448.2 R, 448.2 N, 46.5 E

[56] References Cited
UNITED STATES PATENTS

| | | | |
|---|---|---|---|
| 3,070,566 | 12/1962 | Nitzsche et al. | 260/46.5 G |
| 3,127,363 | 3/1964 | Nitzsche et al. | 260/18 S |
| 3,161,614 | 12/1964 | Brown et al. | 260/46.5 G |

*Primary Examiner*—Melvyn I. Marquis
*Attorney, Agent, or Firm*—Donald J. Voss; E. Philip Koltos; Frank L. Neuhauser

[57] ABSTRACT

A process and composition for producing a cross-linking agent component for two-component room temperature vulcanizable silicone rubber compositions comprising the reaction product of 25 to 75 parts of a silicate selected from the class consisting of alkyl silicates of the formula,

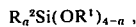
$$R_a^2Si(OR^1)_{4-a},$$

and a liquid partial hydrolysis product of the aforementioned alkyl silicates, 10 to 40 parts of a polysiloxane fluid of the formula,

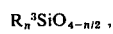
$$R_n^3SiO_{4-n/2},$$

where the polysiloxane fluid is chain-stopped with —OH groups and $R_3^3SiO_{1/2}$ units, where the ratio of the $R_3^3SiO_{1/2}$ units to —OH radicals varies from 3:1 to 1:1 and 10 to 40 parts of a metal salt of an acid selected from the class consisting of monocarboxylic acids and dicarboxylic acid and the metal ion is selected from lead to manganese in the electromotive series of metals and is, more preferably, tin, and $R^1$, $R^2$ and $R^3$ are selected from the class consisting of monovalent hydrocarbon radicals, halogenated monovalent hydrocarbon radicals and mixtures thereof, $a$ is 0 or 1, and $n$ varies fromm 1.9 to 2.1.

22 Claims, No Drawings

CROSS-LINKING AGENTS FOR ROOM TEMPERATURE VULCANIZABLE SILICONE RUBBER COMPOSITIONS

BACKGROUND OF THE INVENTION

The present invention relates to a two-component room temperature vulcanizable silicone rubber composition and, more specifically, relates to a novel cross-linking agent component for such two-component room temperature vulcanizable silicone rubber compositions.

Room temperature vulcanizable silicone rubber compositions are usually prepared and present either in a one-component form or two-component form. Generally, in the two-component room temperature vulcanizable silicon rubber compositions there is present a base silanol-stopped diorganopolysiloxane, filler and other additives, and stored as such. As part of the composition there is also formed a second component which must have the ingredients of a cross-linking agent such as a silicate, or partial hydrolysis products of such silicate, which is mixed with a catalyst which is usually a metal salt of a carboxylic acid. The second component is mixed and stored separately from the base composition which was defined above. When it is ready to cure the composition to form an elastomer, the cross-linking agent and catalyst mixture is mixed into the base composition and preferably thoroughly mixed into the base composition, and the resulting mixture is applied and allowed to cure at room temperature to produce a silicone elastomer.

The above description of a two-component room temperature vulcanizable silicone rubber composition does not describe all such types of compositions but, in a general way, describes the base composition for most two-part room temperature vulcanizable silicone rubber compositions available in the marketplace.

It must be emphasized that the catalyst and cross-linking component is kept separate from the base composition upon manufacture since if the catalyst cross-linking agent component is mixed with the base composition, then the material will start to cure immediately to form a silicone elastomer and will most likely be completely cured in 24 hours. Thus, for storage purposes, the cross-linking agent and catalyst component is maintained separately from the base component until it is desired to mix the components and apply them so as to produce a silicone elastomer.

The one-component room temperature vulcanizable silicone rubber compositions of which there are a great many variations, is formed by mixing the ingredients anhydrously and packaging this mixture as such in one package. When it is desired to cure the composition to form a silicone elastomer, the one-component system is applied and exposed to atmospheric moisture whereupon the one-component system will cure after due course into a silicone elastomer.

With this background it is necessary, with respect to the present invention, to look at the disclosure of the Lewis et al. patent, U.S. Pat. No. 3,186,963, where it is stated that with such two-component room temperature vulcanizable silicone rubber compositions, as described previously, there were three major difficulties which the inventors attempted to correct. It is disclosed that the catalyst and cross-linking component tends to have a high freezing point and, accordingly, it was difficult to use and mix this second component into the base component at low temperatures.

Another disadvantage, as alleged in Lewis et al., was that the catalyst and cross-linking agent component, when taken and mixed into the base component, that the concentration of ingredients would vary from mixture to mixture such that the cure rate would vary from the same batch of the base component.

The most serious disadvantage alleged in the Lewis et al. patent was that the catalyst component seriously degraded in activity upon storage.

Accordingly, Lewis et al. attempted to solve these problems in accordance with their invention by reacting the cross-linking agent, that is, the silicate, with the metal salt of a carboxylic acid at elevated temperatures and utilize the reaction product as the second component in a two-component room temperature vulcanizable silicone rubber composition. Although it was found that such a reaction product had good shelf stability for a limited period of time such as 1 or 2 months, it was still found that the activity of the catalyst reaction product would degrade undesirably over a period as long as 6 months or a year after manufacture. Also, prior to degradation of such a catalyst reaction product, it was found that at the early stages after manufacture of the reaction product that it was highly reactive such that small quantities of it, such as 0.5% to 1% by weight of the base component, was necessary to be utilized with the base component so as to get a desirably long work life of at least 5 minutes. Thus, it is desirable that the mixture have a work life of at least 5 minutes and preferably 10 minutes when mixed into the base composition and also with the use of larger amounts of the cross-linking agent component this is possible with the Lewis et al. reaction product.

As one solution proposed to solve this problem, it was suggested to utilize a dimethylpolysiloxane oil chain-stopped with trimethylsiloxy units or other triorganosiloxy units as a dilutant non-reactive material which could be added to the reaction product of Lewis et al., such that the resulting mixture could be used in larger amounts such as 2% to 30% by weight of the base component. This would allow the second component to be carefully metered into the base component composition to obtain a desirable work life and still utilize a large enough amount of the diluted cross-linking agent component so it could be utilized with facility in the preparation of room temperature vulcanizable silicone rubber compositions. The difficulty with utilizing such a dilutant was that the shelf life of the reaction product catalyst component degraded seriously in that the shelf life was less than the 1 or 2 months.

It is one object of the present invention to produce a catalyst component for a two-component room temperature vulcanizable silicone rubber composition which has standard shelf stability, such as 6 months to a year.

It is another object of the present invention to produce a catalyst component for a two-component room temperature vulcanizale silicone rubber composition in which the catalyst component can be utilized in sufficient large amounts so it can be easily mixed into the base component and has the desired reactivity.

It is an additional object of the present invention to provide an efficient and simple process for producing a catalyst component for a two-component room temperature vulcanizable silicone rubber composition wherein the catalyst component imparts to the resulting uncured mixture, that is, when the catalyst component is mixed with the base component, the desired work life.

It is still an additional object of the present invention to provide a catalyst component reaction product for a two-component room temperature vulcanizable silicone rubber composition, which reaction product is the same irrespective of the different samples that may be taken from the catalyst component reaction product mixture.

It is yet an additional object of the present invention to provide for a two-component room temperature vulcanizable silicone rubber composition which is uniform and has the properties of prolonged shelf life, desirable reactivity and uniformity in application.

These and other objects of the present invention are accomplished by means of the disclosure set forth herein below.

SUMMARY OF THE INVENTION

There is provided by the present invention a cross-linking agent for a two-component room temperature vulcanizable silicone rubber composition comprising the reaction product of 25 to 75 parts of a silicate selected from the class consisting of silicates of the formula,

$$R_a{}^2Si(OR^1)_{4-a} \qquad (1)$$

and a liquid partial hydrolysis product of the aforementioned alkyl silicates, 10 to 40 parts of a hydroxyl-containing polysiloxane fluid of the formula,

$$R_n{}^3SiO_{4-n/2} \qquad (2)$$

where the polysiloxane fluid is chain-stopped with mixtures of —OH groups and $R_3{}^3SiO_{1/2}$ units, where the ratio of the $R_3{}^3SiO_{1/2}$ units to —OH radicals in the fluid varies from 3:1 to 1:1 and 10 to 40 parts of a metal salt of an acid selected from the class consisting of monocarboxylic acid and dicarboxylic acid, where the metal ion is selected from the class consisting of lead, tin, zirconium, antimony, iron, cadmium, barium, calcium, titanium, bismuth and manganese, where $R^1$, $R^2$ and $R^3$ are selected from the class consisting of monovalent hydrocarbon radicals and halogenated monovalent hydrocarbon radicals and mixtures thereof, $a$ is 0 or 1, and $n$ varies from 1.9 to 2.1. Preferably, the metal salt catalyst is tin salt of a monocarboxylic acid and the hydroxyl-containing polysiloxane fluid is a diorganopolysiloxane fluid having a viscosity of anywhere from 100 to 10,000 centipoise at 25°C.

The silicate is preferably of the formula,

$$(R^1O)_4Si \qquad (3)$$

and partial liquid hydrolysis product thereof, where $R^1$ in the above formula is preferably an alkyl radical of 1 to 8 carbon atoms.

The foregoing reaction product cross-linking agent material is preferably prepared by reacting the ingredients set forth above at a temperature of anywhere in the range of 70° to 180°C for a period of time of anywhere from 20 minutes to 8 hours. More preferably, the process should be carried in a temperature range of 130° to 140°C to get the maximum interaction between the reactants and to shorten the reaction time.

The silanol-containing material, most preferably, has $R_3{}^3SiO_{1/2}$ units to hydroxyl radical ratio of 1:1. Such a reaction product is preferably utilized in accordance with the present invention along with other additives such as water, pigments and viscosity depressants, when it is desired to form a silicone elastomer with a base diorganopolysiloxane silanol-containing fluid having a viscosity of anywhere from 1,000 to 10,000,000 centipoise at 25°C. The organo substituent groups in the diorganopolysiloxane base fluid is selected from the class consisting of monovalent hydrocarbon radicals and halogenated monovalent hydrocarbon radicals, into which base fluid there is also preferably mixed various types, as may be desired, of reinforcing and extending fillers, which fillers may be treated or untreated as is the case. The two components then mixed together as described previously will cure uniformly and at the desired reactive rate at room temperature to form a silicone elastomer which mixture will have a work life of at least 5 minutes and, more preferably, 30 minutes, and will cure to a fully cured silicone elastomer in about 24 hours.

DESCRIPTION OF THE PREFERRED EMBODIMENT

In Formula (2), $R^3$, that is, of a polysiloxane fluid, may generally be selected from alkyl radicals such as methyl, ethyl, propyl, butyl, etc.; alkenyl radicals such as vinyl, allyl, etc.; cycloalkyl radicals such as cyclohexyl, cycloheptyl, cyclooctyl, etc.; mononuclear aryl radicals such as phenyl, etc.; aralkyl radicals such as phenylmethyl, phenylethyl, etc.; alkaryl radicals such as methylphenyl, ethylphenyl, propylphenyl, etc.; and various other radicals normally associated with substituent groups for diorganopolysiloxane polymers. Preferably, the $R^3$ radical is selected from cycloalkyl radicals containing from 4 to 8 carbon atoms, alkenyl radicals containing 2 to 8 carbon atoms and aryl radicals and alkyl radicals. Most preferably, $R^3$ is selected from alkyl, alkenyl and phenyl radicals of from 1 to 8 carbon atoms. Generally, in Formula (1), the $R^2$ and $R^1$ radicals also have the same definitions and are selected from the same radicals as the $R^3$ radical. Thus, most preferably, the $R^2$ and $R^3$ radicals are selected from alkyl radicals of 1 to 8 carbon atoms, such as methyl, ethyl, propyl, etc; alkenyl radicals, such as vinyl, allyl from 2 to 8 carbon atoms and mononuclear aryl radicals of 6 to 10 carbon atoms. Most preferably, $R^2$ and $R^1$ are alkyl radicals of from 1 to 8 carbon atoms and, specifically, are selected from methyl or ethyl. In Formula (1) of the alkyl silicate, $a$ is preferably 0 or 1. The alkyl silicates of Formula (1) are well known materials which are commonly available in the silicone industry. These materials are usually produced by taking organotrichlorosilane or tetrachlorosilane and hydrolyzing it and then reacting the reaction product with the appropriate alcohol to form the corresponding alkyltrialkoxysilane or tetraalkoxysilane.

To obtain the partial hydrolysis product of such material, the tetraalkoxysilane is partially hydrolyzed in water in the presence of a catalyst. The partial hydrolyzate forms a separate phase in the water and can be easily extracted in the absence of a catalyst.

With respect to the reaction catalyst of the present case, the other component is the metal salt of a monocarboxylic acid or the metal salt of a dicarboxylic acid where the metal ion is selected from the class consisting of lead, tin, zirconium, antimony, iron, cadmium, barium, calcium, titanium, bismuth and manganese and is preferably a tin salt of a monocarboxylic acid or dicarboxylic acid. Such materials are well known in chemistry and it is not necessary to expound at this point on the production or synthesis of such materials.

The third component of our reaction product catalyst is the polydiorganosiloxane fluid of anywhere from 100 to 10,000 centipoise viscosity of Formula (2), wherein $n$ is selected from 1.9 to 2.1. The definition of the $n$ allows the polysiloxane fluid to have at least 90 mole percent of difunctional units and up to 10 mole percent of monofunctional units and trifunctional units. The unique characteristic of our polysiloxane fluid of Formula (2) in the catalyst reaction product of the present invention is that it contains both triorganosiloxy end-stopping groups and silanol end-stopping groups in the polymer. Generally, in such polysiloxane there is present the ratio of the triorganosiloxy units to the hydroxy end-stopping units which may vary from 3:1 to 1:1 and is preferably in the range of 1:1.

The unique part of our polysiloxane fluid versus the fluid in the prior art discussed above is that because of the presence of the silanol groups in the polysiloxane fluid it is a reactive fluid which intimately reacts with the other ingredients, that is, the metal salt of a carboxylic acid, and also the silicate to produce a reactive and stable reaction product. The presence of the triorganosiloxy groups in the polysiloxane fluid permits it not to be too reactive and thus react with all of the reactive sites of the silicate cross-linking agent.

Such polysiloxane fluids of Formula (2) above are obtained by equilibrating a mixture of cyclic polysiloxanes of preferably pure tetracyclicsiloxanes in the presence of the necessary amount of water and chain-stopper, such as hexamethyldisiloxane, octamethyltrisiloxanes and other chain-stopping siloxanes well known in the silicone art. The amount of water that is added to the cyclic polysiloxanes, along with the amount of chain-stopper such as the hexamethyldisiloxane, will determine the final viscosity of the polysiloxane fluid as well as its silanol content. As can be appreciated, the worker skilled in the art would react the cyclic siloxanes along with the necessary amount of water and chain-stoppers so as to obtain a viscosity and a water content of the polysiloxane fluid which is used in the present invention, within the viscosity ranges specified above. As an alternative in the equilibration process, instead of water, there can be used small quantities of low molecular weight silanol-stopped diorganopolysiloxanes of a viscosity of anywhere from 25 to 1000 centipoise viscosity. As can be appreciated, the final polymer of Formula (2) will contain polymers that are completely hydroxy-stopped and polymers that are completely triorganosiloxy-stopped, as well as polymers that are hydroxy-stopped and triorganosiloxy stopped. It is only necessary that the final polymer or polymer mixture that is used have the concentration of hydroxy groups to triorganosiloxy groups indicated above.

The linear polysiloxane of Formula (2) above is obtained in such a reaction wherein the equilibration process is carried out at a temperature at anywhere from 100° to 180°C for anywhere from 1 hour to 8 hours in the presence of a catalyst. Normally, the catalyst that is used in such reaction may be small quantities of potassium hydroxide and other alkali metal hydroxides, but most preferably there is utilized in such reactions such desirable catalysts such as acid-activated clays such as sulfuric acid activated montromillonite clays, such as the ones sold under the tradename of Filtrol by the Filtrol Corporation of Los Angeles, California.

To obtain the desired reaction product of the present case, there is reacted 25 to 75 parts of the desired alkyl silicate cross-linking agent, 10 to 40 parts of the polysiloxane fluid of Formula (2) above, and 10 to 40 parts of a metal salt of a carboxylic acid which is preferably the tin salt of monocarboxylic acid and dicarboxylic acid. These ingredients are mixed together and heated at a temperature of anywhere from 70° to 180°C for a period of time of anywhere from 20 minutes to 8 hours until these three ingredients are reacted together.

For optimum results, it is preferable that the three ingredients be reacted at a temperature of anywhere from 130° to 140°C again with a period of time varying from 20 minutes to 4 hours. If a temperature lower than 70°C is utilized to react the components, then the period for complete reaction to obtain the desired end product is prolonged such as to cause unnecessary usage of facilities. If a temperature of above 180°C is utilized to react the ingredients, there is obtained other side reactions which take away from the activity of the reaction product. As pointed out, for the optimum temperature of the reaction for the three ingredients that are reacted to produce the catalyst component of the present system is preferably at a temperature of 130° to 140°C.

It is also preferable that a solvent not be used in reacting these agents to obtain the reaction product catalyst of the present case since the solvent will have to be removed from the system unless the final two-component RTV composition is to be used in solvent form. However, if it is desired to carry out the reaction in the solvent, any of the well known non-reactive organic solvents may be utilized, such solvents being selected from benzene, toluene, xylene, heptane, octane, decane and cyclohexane and other such well known inert organic solvents.

It should be noted also that the preferred concentrations of the reactants to produce the catalyst agent of the present case is from 40 to 60 parts by weight of the silicate of Formula (1), from 20 to 30 parts by weight of the polysiloxane fluid of Formula (2) and from 20 to 30 parts by weight of the tin salt. Please note that this concentration of ingredients is not on 100 parts but it is in relation to the parts of the other ingredients, that is, the parts that are given for each of the above components is relative to the proportion of the parts given for the other components. This is true for the concentration ranges in the reaction product given also for the polysiloxane fluid of Formula (2) and the metal salt of a carboxylic acid, the third ingredient in the reaction product of the present case. The concentration of each of the ingredients in the reaction product given in parts by weight is in relation to the concentration in parts by weight of the other ingredients, and if the concentration of one ingredient is increased by a factor of, say, 10 or 100, then the concentration of the other ingredients has to be increased likewise in the ranges indicated.

After the ingredients have been reacted for the foregoing period at the temperature indicated above, the reaction product may be taken and stored as a separate component for long periods of time, that is, it has shelf stability of 6 months to 1 year. If it is then desired at any time or immediately after it is manufactured, it can be mixed with the base component of a two-component RTV composition and the composition allowed to cure to form a silicone elastomer as is well known for such two-component room temperature vulcanizable silicone rubber compositions.

The base component of a two-part room temperature vulcanizable silicone rubber composition, as is well known, comprises a diorganopolysiloxane polymer which is basically silanol chain-stopped or, simply stated, contains terminal-bonded hydroxy groups having a viscosity varying from 1,000 to 10,000,000 centipoise at 25°C where the organo groups are selected from the class consisting of monovalent hydrocarbon radicals and halogenated monovalent hydrocarbon radicals and cyanoalkyl radicals. Such a silanol-stopped diorganopolysiloxane fluid may have the formula,

$$R_x{}^4SiO_{4-x/2} \qquad (4)$$

where $R^4$ is selected from the class consisting of monovalent hydrocarbon radicals, halogenated monovalent hydrocarbon radicals, cyanoalkyl radicals and $x$ varies from 1.9 to 2.01. The polymer of such a material or mixture of polymers as the basic silanol-stopped polysiloxane more preferably has a viscosity of 1,000 to 100,000 centipoise at 25°C. Such a material as in Formula (4) must contain less than 10 mole percent of monofunctional siloxy units and trifunctional siloxy units and the rest of the units being difunctional siloxy units. Preferably, 95 mole percent or more of the polymers of the base fluid of Formula (4) are diorganosiloxy difunctional siloxy units.

The diorganopolysiloxane polymer can be produced in various ways. A simple procedure is to take a mixture of cyclic siloxanes and, more preferably, a mixture of pure cyclic tetrasiloxanes and in the presence of small amounts of alkali metal hydroxides such as potassium hydroxide, at elevated temperatures above 150°C, equilibrate this mixture also with a small amount of chain-stopper such as hexamethyldisiloxane, octamethyltrisiloxane and other well known chain-stoppers, and equilibrate this mixture in the presence of 100 to 500 parts per million of KOH, until a high viscosity diorganopolysiloxane polymer is obtained in about 85% yield.

The resulting high viscosity diorganopolysiloxane polymer may be taken after the catalyst is neutralized and subjected to steam distillation or equilibrated with a small amount of water to obtain a silanol-terminated diorganopolysiloxane of anywhere from 100,000 to 10,000,000 centipoise viscosity at 25°C. For the lower viscosity silanol-stopped diorganopolysiloxane fluids of Formula (4) above, that is, 1,000 to 100,000 centipoise at 25°C, such materials can be obtained in much the same way as was explained above for the polysiloxane fluid of Formula (2), that is, equilibrate a mixture of cyclic siloxanes and, more particularly, a mixture of cyclic tetrasiloxanes in the presence of small amount of water or in the presence of small amounts of very low molecular weight silanol-stopped diorganopolysiloxanes of anywhere from 25 to 1,000 centipoise viscosity, with or without water, as is desired with respect to the silanol content of the final produce that is desired to be obtained. This mixture can be equilibrated in the presence of an acid activated clay catalyst or even equilibrated in the presence of a mild acid such as toluene sulfonic acid. In the formula of the diorganopolysiloxane fluid of Formula (4) above, $R^4$ may be selected from any monovalent hydrocarbon substituent groups. Thus, the $R^4$ may be selected from alkyl radicals such as methyl, ethyl, propyl; alkenyl radicals such as vinyl, allyl; mononuclear aryl radicals such as phenyl; aralkyl radicals such as phenylmethyl, phenylethyl and alkaryl radicals such as methylphenyl, ethylphenyl and cyanoalkyl radicals such as cyanomethyl, cyanoethyl, etc. Most preferably, the $R^4$ radical is selected from alkyl radicals of 1 to 8 carbon atoms; alkenyl radicals of 2 to 8 carbon atoms; cycloalkyl radicals of 4 to 8 carbon atoms and phenyl radicals. Into this base silanol-stopped diorganopolysiloxane fluid of Formula (4) above, there may be mixed any number of other ingredients such as pigment. There can be mixed into it, based on the amount of silanol-terminated polydiorganosiloxane of Formula (4), from 5 to 300% by weight of a filler, heat-aging additives, flame retardants and various other ingredients. It should be noted that such ingredients may also be mixed with the reaction product cross-linking component of the present invention, that is, all such ingredients may be mixed in first component or the second component, as is desired to obtain various properties. Most preferably, the filler and the pigment are usually incorporated in the base silanol-stopped diorganopolysiloxane. The filler is preferably silica filler which is either precipitated silica filler or fumed silica filler which may be treated with various agents such as, for instance, there can be preferably utilized as a filler in the present invention which is treated with cyclic polysiloxanes prior to its incorporation into the silanol-stopped diorganopolysiloxane base fluid. Other processes and other treated fillers are those, for instance, disclosed in the patent of M. D. Beers, U.S. Pat. No. 3,837,878 entitled Process for Treating Silica Fillers. As noted, such filler is utilized in the total composition preferably at the concentration of 5% to 300% by weight, based on the silanol-stopped diorganopolysiloxane of Formula (4).

Besides the silica fillers which are usually considered reinforcing fillers that may be used, various extending fillers such as diatomaceous earth, zinc oxide, etc. may be used. There is preferably employed finely divided silica base fillers of the highly reinforcing type which are characterized by a particle diameter of less than 500 millimicrons and by surface areas of greater than 50 square meters per gram. Inorganic filler materials of a composition other than those preferred can be employed alone or in combination with the preferred fillers with good results. Such filler materials such as titanium, iron oxide, aluminum oxide, as well as the inorganic filler materials known as inert fillers which can also include, among others, diatomaceous earth, calcium carbonate and quartz can preferably be employed in combination with highly reinforcing silica fillers to improve the tensile strength or the hardness of the elastomeric product.

Other examples of suitable extending fillers are diatomaceous silica, aluminum silicate, zinc oxide, zirconium silicate, barium sulfate, zinc sulfide and finely divided silica and surface-bonded alkoxy groups.

Into this base silanol-stopped diorganopolysiloxane fluid of Formula (4) above there may be, of course, incorporated besides the filler or fillers, various amounts of a process aid, pigments and other ingredients, such as heat-aging ingredients and other types of materials commonly associated in the compositions of two-component room temperature vulcanizable silicone rubber compositions.

To cure the composition to form a silicone elastomer, the base component, that is, the silanol-stopped diorganopolysiloxane of Formula (4), with the amount of filler or fillers indicated above, is taken and there is mixed into it the reaction product catalyst cross-linking agent of the present case which is utilized based on the weight of the first component at a concentration of from 2% to 30% by weight. There is utilized the cross-linking reaction product of the present case at concentrations of 2% to 30% by weight based on the weight of the silanol-stopped diorganopolysiloxane of Formula (4) combined with the weight of the filler or fillers in the concentration ranges shown above. The mixture is then applied to whatever surface it is desired to coat or mold or for whatever use it is intended to serve and the material will then slowly cure into a silicone elastomer. During cure of the mixture, a skin will form in 20 minutes but the cure will not be fully completed for 24 hours, after which time there will be formed a completely formed silicone elastomer as is well known with such two-component room temperature vulcanizable silicone rubber compositions.

In all the examples given below which are exemplary, there is utilized the same base composition. This base composition comprises 30.48% by weight of a blend of two silanol-stopped dimethylpolysiloxane polymers, which blend has a viscosity of 8,000 centipoise at 25°C, 12.13% by weight calcium carbonate, 48.42% of a dimethylpolysiloxane containing terminal methylsiloxy units and silanol-terminated units and having a silanol content of 0.07% by weight and having a viscosity of 25°C of 600–900, which material is present as a plasticizer, 0.41% by weight of hydrogenated castor oil, 7.95% by weight of glass microballoons and 0.61% by weight of water which is added to the base composition to enhance deep section cure of the final two-component room temperature vulcanizable silicone rubber composition. The above concentrations are all in % by weight.

This same composition was utilized with the catalyst cross-linking agent disclosed in the examples below to evaluate the curing properties of the present reaction product catalyst versus the curing properties of the prior art second component of a two-component room temperature vulcanizable silicone rubber composition. The examples given below are given for the purpose of illustrating the invention and are not given in any way for the purpose of defining or setting limits in the present invention. All parts in the examples are by weight. The base composition which was defined above and is utilized in all the three examples shall be referred to hereinafter in the examples as "Base Composition."

EXAMPLE I

There was prepared a reation product catalyst by reacting in a three-necked 1000 milliliter round bottom flask, equipped with stirrer, thermometer and a nitrogen trap, 75 parts of tetraethylorthosilicate and 25 parts of dibutyl tin dilaurate. This material was reacted at 140°C for 2 hours. A portion of this material in the parts indicated below were then mixed and reacted with 20 parts of base, that is, 2 parts of this reaction product was mixed and reacted with 20 parts of the Base Composition, as indicated in the table below. This material was used to cure the Base Composition initially, after it was first prepared, then after it was aged at 70°C for 1 week, after a portion was aged at 70°C for 2 weeks and after a portion was aged at 70°C for 3 weeks. The results are indicated in Table I below.

TABLE I

| CATALYSTS USED AT 10 TO 1 CATALYZING RATIO PARTS BY WEIGHT | | | | | |
|---|---|---|---|---|---|
| Base Composition | = | 20 | 20 | 20 | 20 |
| Catalyst | = | 2 | 2 | 2 | 2 |
| Work Life (mins) | = | 2 | 2.2 | 2.6 | 3 |
| Tack Free Time (mins) | = | 3 | 3.3 | 4 | 4.8 |
| 1 Hr. Shore A | = | 8 | 8 | 5 | 5 |
| 24 Hr. Shore A | = | 22 | 22 | 20 | 19 |
| Status of Test — Initial | 70°C 1 Wk. | | 70°C 2 Wks. | 70°C 3 Wks. | |

The results of Table I indicate that the prior art catalyst composition had good shelf stability but, nevertheless, had a very short life and a very short tack-free time, which is undesirable in many applications in the forming of molds and other applications of two-part room temperature vulcanizable silicone rubber compositions.

EXAMPLE 2

There was prepared a catalyst composition by mixing together 70 parts of trimethylsiloxy end-stopped dimethylpolysiloxane of 50 centipoise viscosity at 25°C, 30 parts of the catalyst reaction product of Example 1. As indicated in Table II below, 2 parts of this catalyst mixture was used per 20 parts of the Base Composition. Then such a catalyst cross-linking agent mixture was utilized in curing the Base Composition immediately after it was formed after it had been aged at 70°C for 1 week and after it had been aged at 70°C for 2 weeks. The results of such testing is shown in Table II below.

TABLE II

| CATALYSTS USED AT 10 TO 1 RATIO PARTS BY WEIGHT | | | | |
|---|---|---|---|---|
| Base Composition | = | 20 | 20 | 20 |
| Catalyst | = | 2 | 2 | 2 |
| Work Life (mins) | = | 10 | 150 | NO |
| Tack Free Time (mins) | = | 15.5 | 250 | CURE |
| 1 Hr. Shore A | = | 12 | 0 | 24 |
| 24 Hr. Shore A | = | 22 | 22 | HRS. |
| Status of Test = Initial | 70°C 1 Wk. | 70°C 2 Wks. | | |

As Table II indicates, this catalyst system had very poor shelf-aging properties, that is, after 1 week at 70°C, the catalyst would cure the base composition only after a prolonged work life and tack-free time, and after 2 weeks at 70°C shelf-aging the material would not even cure in 24 hours.

EXAMPLE 3

Into a three-necked 100 ml round bottom flask equipped with stirrer, thermometer and nitrogen trap there was added 25 parts of dibutyl tin dilaurate, 50 parts of tetraethylorthosilicate and 25 parts of a 600 to 900 centipoise at 25°C of a trimethylsiloxy silanol end-stopped dimethylpolysiloxane oil where the trimethylsiloxy chain-stopping units to the hydroxy chain-stopping units was at a ratio of 1:1 and the resulting ingredients were heated at 140°C for about 2 hours. This catalyst material was mixed at the same base composition as was utilized in the previous two examples at the same concentrations as indicated in Table III below.

TABLE III

| CATALYSTS USED AT 10 TO 1 CATALYZING BASE RATE PARTS BY WEIGHT | | | | | |
|---|---|---|---|---|---|
| Base Composition | 20 | 20 | 20 | 20 | 20 |
| Catalyst | 2 | 2 | 2 | 2 | 2 |
| Work Life (mins) | 7 | 7 | 7 | 7 | 7 |
| Tack Free Time (mins) | 11 | 11 | 11 | 12 | 14 |
| 1 Hr. Shore A | 11 | 11 | 11 | 10 | 11 |
| 24 Hrs. Shore A | 23 | 23 | 23 | 23 | 23 |
| Status of Test | Initial | 70°C 1 Wk. | 70°C 2 Wks. | 70°C 4 Wks. | 70°C 80 days |

As the results in Table III indicate, after 80 days at 70°C, the catalyst reaction product of the present invention had a good work life, a good tack-free time which is adequate in many intricate applications such as mold making, and was also exceptionally shelf stable.

We claim:

1. A cross-linking agent for room temperature vulcanizable silicone rubber compositions comprising the reaction product of 25 to 75 parts of a silicate selected from the class consisting of silicates of the formula, $$R_a{}^2Si(OR^1)_{4-a},$$

and a liquid partial hydrolysis product of the aforementioned alkyl silicates and 10 to 40 parts of a polysiloxane fluid of the formula, $$R_n{}^3SiO_{4-n/2},$$

where the polysiloxane fluid is chain-stopped with mixtures of —OH groups and $R_3{}^3SiO_{1/2}$ units, where the ratio of the $R_3{}^3SiO_{1/2}$ units to —OH groups in the fluid varies from 3:1 to 1:1 and a metal salt of an acid selected from the class consisting of monocarboxylic acid and dicarboxylic acid and the metal ion is selected from the class consisting of lead, tin, zirconium, antimony, iron, cadmium, barium, calcium, titanium, bismuth and manganese, where $R^1$, $R^2$ and $R^3$ are selected from the class consisting of monovalent hydrocarbon radicals and halogenated monovalent hydrocarbon radicals and mixtures thereof, $a$ is 0 or 1, and varies from 1.9 to 2.1.

2. The cross-linking agent of claim 1 wherein $R^3$ is methyl, the metal salt is a tin salt of a monocarboxylic acid, and the polysiloxane fluid has a viscosity that varies from 100 to 10,000 centipoise at 25°C.

3. The cross-linking agent of claim 1 wherein the silicate is selected from the class consisting of silicates of the formula, $$(R^1O)_4Si,$$

and partial liquid hydrolysis products thereof, and $R^1$ is ethyl.

4. The cross-linking agent of claim 1 wherein the polysiloxane fluid contains at least 90 mole percent of difunctional units and up to 10 mole percent of monofunctional units and trifunctional units.

5. The cross-linking agent of claim 1 wherein $R^1$, $R^2$ and $R^3$ are selected from the class consisting of alkyl radicals of 1 to 8 carbon atoms, alkenyl radicals of 2 to 8 carbon atoms, cycloalkyl radicals of 4 to 8 carbon atoms and mononuclear aryl, alkaryl radicals of up to 10 carbon atoms and halogenated derivatives of the foregoing radicals.

6. The cross-linking agent of claim 1 wherein in the polysiloxane fluid the ratio of $R_3{}^3SiO_{1/2}$ units to —OH radicals is 1:1 and $R^3$ is methyl.

7. A process for producing a cross-linking agent for room temperature vulcanizable silicone rubber compositions comprising reacting at a temperature in the range of 70° to 180°C, a mixture containing from 25 to 75 parts of a silicate selected from the class consisting of silicates of the formula, $$R_a{}^2Si(OR^1)_{4-a},$$

and liquid partial hydrolysis products of the aforementioned silicate, 10 to 40 parts of a polysiloxane fluid of the formula, $$R_n{}^3SiO_{4-n/2}$$

where the polysiloxane fluid is chain-stopped with mixtures of —OH groups and $R_3{}^3SiO_{1/2}$ units, wherein the ratio of $R_3{}^3SiO_{1/2}$ units to —OH groups in the fluid radicals varies from 3:1 to 1:1 and 10 to 40 parts of a tin salt of an acid selected from the class consisting of monocarboxylic acid and dicarboxylic acid, where $R^1$, $R^2$ and $R^3$ are selected from the class consisitng of monovalent hydrocarbon radicals and halogenated monovalent hydrocarbon radicals and mixtures thereof, where $a$ is 0 or 1, and $n$ varies from 1.9 to 2.1.

8. The process of claim 7 wherein the reaction is carried out for a period varying from 20 minutes to 8 hours.

9. The process of claim 7 wherein the reaction is preferably carried out at a temperature in the range of 130° to 140°C.

10. The process of claim 7 wherein the silicate is present at a concentration of 40 to 60 parts, the polysiloxane fluid is present at a concentration of 20 to 30 parts and the tin salt is present at a concentration of 20 to 30 parts.

11. The process of claim 7 wherein $R^3$ is methyl and the polysiloxane fluid has a viscosity that varies from 100 to 10,000 centipoise at 25°C.

12. The process of claim 7 wherein the silicate is selected from the class consisting of silicates of the formula, $$(R^1O)_4Si,$$

and partial liquid hydrolysis products thereof and $R^1$ is ethyl.

13. The process of claim 7 wherein the polysiloxane fluid contains at least 90 mole percent of difunctional units and up to 10 mole percent of monofunctional units and trifunctional units.

14. The process of claim 7 wherein $R^1$, $R^2$ and $R^3$ are selected from the class consisting of alkyl radicals of 1 to 8 carbon atoms, cycloalkyl radicals of 4 to 8 carbon atoms, alkenyl radicals of 2 to 8 carbon atoms and mononuclear aryl, alkaryl radicals of up to 10 carbon atoms and halogenated derivatives of the foregoing radicals.

15. The process of claim 7 wherein the polysiloxane fluid the ratio of $R_3^3SiO_{1/2}$ units to —OH radicals is 1:1 and $R^3$ is methyl.

16. A room temperature vulcanizable silicone rubber composition comprising (a) a diorganopolysiloxane containing terminal-bonded hydroxy groups having a viscosity varying from 1,000 to 10,000,000 centipoise at 25°C, where the organo group is selected from the class consisting of monovalent hydrocarbon radicals, halogenated monovalent hydrocarbon radicals and cyanoalkyl radicals, (b) from 5% to 300% by weight, based on the diorganopolysiloxane, of a filler, and (c) from 2% to 30% by weight based on the weight of (a) and (b) of a cross-linking agent which is the reaction product of 25 to 75 parts of a silicate selected from the class consisting of silicates of the formula, $$R_n^2Si(OR^1)_{4-n},$$

and liquid partial hydrolysis products of the aforementioned silicate, 10 to 40 parts of a polysiloxane fluid of the formula, $$R_n^3SiO_{4-n/2},$$

where the polysiloxane fluid is chain-stopped with mixtures of —OH groups and $R_3^3SiO_{1/2}$ units, where the ratio of $R_3^3SiO_{1/2}$ units to —OH groups in the fluid radicals varies from 3:1 to 1:1 and 10 to 40 parts of a metal salt of an acid selected from the class consisting of monocarboxylic acid, dicarboxylic acid and the metal ion is selected from the class consisting of lead, tin, zirconium, antimony, iron, cadmium, barium, calcium, titanium, bismuth and manganese, $R^1$, $R^2$ and $R^3$ are selected from the class consisting of monovalent hydrocarbon radicals and halogenated monovalent hydrocarbon radicals and mixtures thereof, where $a$ is 0 or 1, and $n$ varies from 1.9 to 2.1.

17. The composition of claim 16 wherein in (c) the silicate is present at a concentration of 40 to 60 parts, the polysiloxane fluid is present at a concentration of 20 to 30 parts and the metal salt is present at a concentration of 20 to 30 parts.

18. The composition of claim 16 wherein in (c) $R^3$ is methyl, the metal salt is a tin salt of a monocarboxylic acid and the polysiloxane has a viscosity that varies from 100 to 10,000 centipoise at 25°C.

19. The composition of claim 16 wherein in (c) the silicate is selected from the class consisting of silicates of the formula, $$(R^1O)_4Si,$$

and partial liquid hydrolysis products thereof, and $R^1$ is ethyl.

20. The composition of claim 16 wherein in (c) the polysiloxane fluid contains at least 90 mole percent of difunctional units and up to 10 mole percent of monofunctional units and trifunctional units.

21. The composition of claim 16 wherein $R^1$, $R^2$ and $R^3$ are selected from the class consisting of alkyl radicals of 1 to 8 carbon atoms, alkenyl radicals of 2 to 8 carbon atoms, cycloalkyl radicals of 4 to 8 carbon atoms and mononuclear aryl, alkaryl radicals of up to 10 carbon atoms and halogenated derivatives of the foregoing radicals.

22. The composition of claim 16 wherein in (c) in the polysiloxane fluid the ratio of $R_3^3SiO_{1/2}$ units to —OH radicals is 1:1 and $R^3$ is methyl.

* * * * *